(12) United States Patent
Pillay-Esnault (10) Patent No.: US 10,362,522 B2
(45) Date of Patent: Jul. 23, 2019

(54) OPTIMIZED PACKET REPLICATION IN PREDICTIVE ROUTING IN LISP FOR CELLULAR HANDOVER

(71) Applicant: Futurewei Technologies, Inc., Plano, TX (US)

(72) Inventor: Padmadevi Pillay-Esnault, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/634,379

(22) Filed: Jun. 27, 2017

(65) Prior Publication Data

US 2018/0007604 A1    Jan. 4, 2018

Related U.S. Application Data

(60) Provisional application No. 62/356,074, filed on Jun. 29, 2016.

(51) Int. Cl.
| | |
|---|---|
| *H04L 29/06* | (2006.01) |
| *H04W 36/14* | (2009.01) |
| *H04W 36/26* | (2009.01) |
| *H04W 36/02* | (2009.01) |
| *H04W 36/00* | (2009.01) |
| *H04W 84/12* | (2009.01) |

(52) U.S. Cl.
CPC .......... *H04W 36/26* (2013.01); *H04L 65/103* (2013.01); *H04L 65/104* (2013.01); *H04W 36/026* (2013.01); *H04W 36/14* (2013.01); *H04L 65/1083* (2013.01); *H04W 36/0016* (2013.01); *H04W 36/0061* (2013.01); *H04W 36/023* (2013.01); *H04W 84/12* (2013.01)

(58) Field of Classification Search
CPC . H04W 36/26; H04W 36/14; H04W 36/0016; H04W 84/12
See application file for complete search history.

(56) References Cited

U.S. PATENT DOCUMENTS

| | | | | |
|---|---|---|---|---|
| 2010/0091734 | A1* | 4/2010 | Park ...................... | H04W 92/20 370/331 |
| 2010/0284365 | A1* | 11/2010 | Sundell ............. | H04W 36/0066 370/331 |
| 2011/0002304 | A1* | 1/2011 | Lee ........................ | H04W 36/02 370/331 |

(Continued)

FOREIGN PATENT DOCUMENTS

| | | |
|---|---|---|
| EP | 2574139 A1 | 3/2013 |
| WO | 2007079771 A1 | 7/2007 |
| WO | 2009011621 A1 | 1/2009 |

OTHER PUBLICATIONS

Farinacci, el al., "The Locator/ID Separation Protocol (LISP)," RFC 6830, Jan. 2013, 75 pages.

(Continued)

*Primary Examiner* — Qun Shen
(74) *Attorney, Agent, or Firm* — Conley Rose, P.C.

(57) ABSTRACT

Disclosed herein are various embodiments designed to implement a handover operation of a user entity (UE) from a source base station to a target base station using a predictive routing feature in LISP or other ID protocols for packet replication to reduce latency in packet delivery to the user entity.

20 Claims, 8 Drawing Sheets

(56) References Cited

U.S. PATENT DOCUMENTS

| | | | | |
|---|---|---|---|---|
| 2011/0188472 | A1* | 8/2011 | Jeon | H04W 36/0083 370/331 |
| 2012/0082314 | A1* | 4/2012 | Fukuda | H04L 63/061 380/270 |
| 2012/0201186 | A1* | 8/2012 | Awano | H04L 12/1877 370/312 |
| 2012/0214445 | A1* | 8/2012 | Stojanovski | H04L 63/164 455/411 |
| 2012/0282929 | A1* | 11/2012 | Persson | H04W 36/0033 455/436 |
| 2014/0003322 | A1 | 1/2014 | Grinshpun et al. | |
| 2016/0072850 | A1* | 3/2016 | Zhang | H04L 63/306 726/12 |
| 2016/0302110 | A1* | 10/2016 | Baboescu | H04L 12/4633 |
| 2016/0353350 | A1* | 12/2016 | Engstrom | H04W 36/32 |
| 2018/0279358 | A1* | 9/2018 | Babaei | H04W 72/0453 |

OTHER PUBLICATIONS

Farinacci, el al., Locator/ID Separation Protocol (LISP), draft-ietf-lisp-24, Nov. 13, 2012, 91 pages.
Farinacci, el al., "LISP Predictive RLOCs," draft-farinacci-lisp-predictive-rlocs-00, May 6, 2016, 13 pages.
Pillay-Esnault, "Predictive Routing for Mobility," U.S. Appl. No. 62/332,639, filed May 6, 2016, 27 pages.
Pillay-Esnault, "Predictive Routing for Mobility," U.S. Appl. No. 15/584,957, filed May 2, 2017, 34 pages.
Farinacci, D., et al., "LISP Geo-Coordinate Use-Cases," draft-farinacci-lisp-geo-00, Apr. 14, 2016, 6 pages.
Farinacci, D., et al., "LISP Geo-Coordinate Use-Cases," draft-farinacci-lisp-geo-01, Oct. 12, 2016, 7 pages.
Farinacci, D., et al., "LISP Geo-Coordinate Use-Cases," draft-farinacci-lisp-geo-02, Oct. 28, 2016, 10 pages.
Bradner, S., et al., "Key words for use in RFCs to Indicate Requirement Levels," RFC 2119, Mar. 1997, 3 pages.
Farinacci, D., et al., "LISP Predictive RLOCs," draft-farinacci-lisp-predictive-rlocs-01, Nov. 13, 2016, 13 pages.
Farinacci, D., et al., "LISP Data-Plane Confidentiality," draft-ietf-lisp-crypto-03, Dec. 4, 2015, 17 pages.
Farinacci, D., et al., "LISP Data-Plane Confidentiality," draft-ietf-lisp-crypto-04, May 31, 2016, 18 pages.
Farinacci, D., et al., "LISP Data-Plane Confidentiality," draft-ietf-lisp-crypto-05, Jun. 27, 2016, 18 pages.
Farinacci, D., et al., "LISP Data-Plane Confidentiality," draft-ietf-lisp-crypto-06, Jun. 29, 2016, 18 pages.
Farinacci, D., et al., "LISP Data-Plane Confidentiality," draft-ietf-lisp-crypto-07, Sep. 19, 2016, 19 pages.
Farinacci, D., et al., "LISP Data-Plane Confidentiality," draft-ietf-lisp-crypto-08, Sep. 25, 2016, 19 pages.
Farinacci, D., et al., "LISP Data-Plane Confidentiality," draft-ietf-lisp-crypto-09, Oct. 12, 2016, 21 pages.
Farinacci, D., et al., "LISP Data-Plane Confidentiality," draft-ietf-lisp-crypto-10, Oct. 14, 2016, 21 pages.
Farinacci, D., et al., "LISP Canonical Address Format (LCAF)," draft-ietf-lisp-lcaf-12, Mar. 14, 2016, 41 pages.
Farinacci, D., et al., "LISP Canonical Address Format (LCAF)," draft-ietf-lisp-lcaf-13, May 3, 2016, 41 pages.
Farinacci, D., et al., "LISP Canonical Address Format (LCAF)," draft-ietf-lisp-lcaf-14, Jul. 19, 2016, 41 pages.
Farinacci, D., et al., "LISP Canonical Address Format (LCAF)," draft-ietf-lisp-lcaf-15, Sep. 19, 2016, 43 pages.
Farinacci, D., et al., "LISP Canonical Address Format (LCAF)," draft-ietf-lisp-lcaf-16, Oct. 1, 2016, 43 pages.
Farinacci, D., et al., "LISP Canonical Address Format (LCAF)," draft-ietf-lisp-lcaf-17, Oct. 12, 2016, 43 pages.
Farinacci, D., et al., "LISP Canonical Address Format (LCAF)," draft-ietf-lisp-lcaf-18, Oct. 14, 2016, 44 pages.
Farinacci, D., et al., "LISP Canonical Address Format (LCAF)," draft-ietf-lisp-lcaf-19, Oct. 18, 2016, 44 pages.
Farinacci, D., et al., "LISP Canonical Address Format (LCAF)," draft-ietf-lisp-lcaf-20, Oct. 29, 2016, 44 pages.
Farinacci, D., et al., "LISP Canonical Address Format (LCAF)," draft-ietf-lisp-lcaf-21, Nov. 16, 2016, 44 pages.
Farinacci, D., et al., "LISP Canonical Address Format (LCAF)," draft-ietf-lisp-lcaf-22, Nov. 28, 2016, 47 pages.
Maino, F., et al., "LISP-Security (LISP-SEC)," draft-ietf-lisp-sec-10, Apr. 13, 2016, 19 pages.
Maino, F., et al., "LISP-Security (LISP-SEC)," draft-ietf-lisp-sec-11, Oct. 3, 2016, 19 pages.
Maino, F., et al., "LISP-Security (LISP-SEC)," draft-ietf-lisp-sec-12, Nov. 16, 2016, 22 pages.
Moreno, V., et al., "Signal-Free LISP Multicast," draft-ietf-lisp-signal-free-multicast-01, Apr. 21, 2016, 19 pages.
Moreno, V., et al., "Signal-Free LISP Multicast," draft-ietf-lisp-signal-free-multicast-02, Oct. 17, 2016, 19 pages.
Portoles, M., et al., "LISP L2/L3 EID Mobility Using a Unified Control Plane," draft-portoles-lisp-eid-mobility-00, Apr. 7, 2016, 20 pages.
Foreign Communication From a Counterpart Application, PCT Application No. PCT/CN2017/090614, English Translation of International Search Report dated Sep. 11, 2017, 8 pages.
Foreign Communication From a Counterpart Application, PCT Application No. PCT/CN2017/090614, English Translation of Written Opinion dated Sep. 11, 2017, 4 pages.

* cited by examiner

OPTIMIZED PACKET REPLICATION IN PREDICTIVE ROUTING IN LISP FOR CELLULAR HANDOVER

CROSS-REFERENCE TO RELATED APPLICATIONS

This application claims priority to U.S. provisional patent application number 62/356,074 filed Jun. 29, 2016 by Padmadevi Pillay-Esnault and titled "Optimized Packet Replication in Predictive routing in LISP for Cellular Handover," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the Internet protocol (IP) networks, an IP address represent both the location and the identity (ID) of an endpoint on a node. Originally computers were tethered to fixed networks, and were expected to be fixed for the session duration. Therefore, the IP address was used to initiate sessions. Today, mobile nodes such as smartphones may have a change of address when they relocate or change network access (e.g., from Wireless Fidelity (Wi-Fi) to cellular). Therefore, any session tied to an IP address will be disconnected if the node is no longer accessible at the IP address used.

SUMMARY

According to one aspect of the present disclosure, there is provided a method, an apparatus, and a computer program product for performing a handover operation. In one embodiment, the method includes transmitting packets to a mobile device via a source base station currently connected to the mobile device. The method further includes receiving a target base station identifier that identifies a target base station predicted to be the next base station to be connected to the mobile device via a handover operation. Communication with the target base station is established in response to receiving the target base station identifier. The packets currently being transmitted to the source base station are replicated and transmitted to the target base station while also continuing to transmit the packets to the source base station. Once the method receives notification of the mobile device completing the handover operation to the target base station, the transmission path of the packets to the mobile device is modified from the source base station to the target base station, and replication of the packets is terminated.

Optionally, in any of the preceding aspects the target base station buffers the replicate packets and transmits the buffered replicate packets to the mobile device following the handover operation. This process eliminates the need for the source base station to forward the packets to the target base station. The disclosed embodiment may be applicable to an S1 or an X2 handover in a Long-Term Evolution (LTE) network.

Optionally, in any of the preceding aspects the target base station or multiple target base stations may be selected to be the recipient of duplicated packets to cover the most likely target base stations that a mobile device will be handed over to. In accordance with an embodiment, the method includes replicating the packets to each of the identified target base stations. Thus, as long as the mobile device is handed over to one of the identified target base stations, no routing of packets from the source base station to the target base station is required as the packets are already buffered on the target. Thus, the disclosed embodiments reduce latency in packet delivery to a mobile device during a handover.

Other features of the various embodiments and advantages thereof are described below in the Detailed Description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments designed to implement a handover operation of a user entity (UE) from a source base station to a target base station using a predictive routing feature in LISP for packet replication to reduce latency in packet delivery to the user entity. A handover operation as referenced herein refers to the process of transferring an ongoing call or data session from one channel connected to the core network to another channel. For example, the communication channel of a user entity (UE) such as a mobile device in communication with a first base station may be transferred to a second base station as the UE moves away from the first base station and towards the second base station.

IP address semantics have long represented both the location and the identity of a device. This was due in part because during the time the IP address was invented most of the nodes were fixed and representing both the ID and location made sense. However, having one address representing both the location and the identity of a device in the IP address is no longer accurate for mobile node. Some internet protocols that rely on this assumption of duality no longer work for mobility use cases. Prior mobility solutions providing workarounds to this assumption were either based on (1) redirecting of the traffic or (2) disassociating the ID and the location as in Location ID Separation Protocol (LISP) or other ID Oriented architectures. LISP is a "map-and-encapsulate" protocol which is developed by the Internet Engineering Task Force (IETF) LISP Working Group. LISP supports the separation of the IP version 4 (IPv4) and IP version 6 (IPv6) address space following a network-based map-and-encapsulate scheme. In LISP, both identifiers and locators can be IP addresses or arbitrary elements like a set of Global Positioning System (GPS) coordinates or a Media Access Control (MAC) address.

The above prior solutions including LISP treat the mobility of nodes as something unpredictable and random, and therefore try to solve a generic problem, which produces sub-optimal solutions. For example, the mechanisms for handover of a UE defined in 3rd Generation Partnership Project (3GPP) creates triangular and sub-optimal routing when using General Packet Radio Service (GPRS) Tunneling Protocol (GTP). For instance, during a handover process of a UE, the in-flight packets are buffered on the source base station (BS) and then re-forwarded using tunneling to the target BS. A UE as referenced herein is a mobile terminal or mobile device, such as, but not limited to, a cellular phone, smartphone, tablet, laptop, or other network-connected mobile devices. Similar issues apply to the handover mechanism of a UE defined in LTE networks using S1 and/or X2 handover mechanisms. S1 handover is defined in "S1 3GPP TS 36.413 V10.5. S1 Application Protocol" and later versions. X2 handover is defined in "X2 3GPP TS 36.423 V10.5. X2 Application Protocol" and later versions.

FIGS. 1A-1E are schematic diagrams illustrating triangular routing that occurs during a typical S1 handover procedure in an LTE network. In the depicted embodiment, the LTE network comprises a UE 100, a source BS 110, a target BS 120, a mobility management entity (MME) 130, a serving gateway (SGW) 140, and a packet data network (PDN) gateway (PGW) 150. Beginning with FIG. 1A, the UE 100 communicates with the source BS 110 using radio bearer 102. As referenced herein, the source BS 110 is the current base station in communication with the UE 100. Radio bearers are channels offered by Layer 2 to higher layers for the transfer of either user or control data. A base station as referenced herein is a point of interface (e.g., transceivers located on a tower) that sends and receives signals for controlling the mobile terminals in one or more cells. The base station receives radio transmissions from all the UEs using the analog and digital signal processing functions. The base station controls the low-level operation of all its connected UEs by sending them signaling messages such as handover commands. In certain embodiments disclosed herein, a base station can be an evolved base station, called eNodeB, or a radio access network (RAN) base station. The target BS 120 is the base station that controls the UEs in the area or cells that the UE 100 may be moving towards (i.e., the potential future location of the UE 100).

Figure 1A:
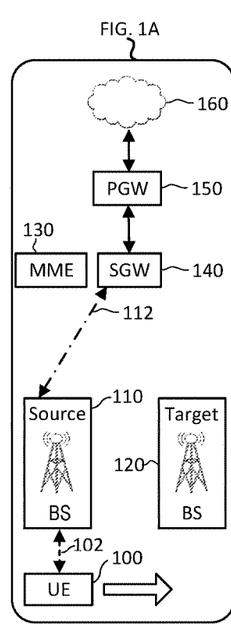
FIGS. 1A-1E are schematic diagrams illustrating triangular routing that occurs during a typical S1 handover procedure in an LTE network.

As illustrated in FIG. 1A, the source BS 110 communicates both upstream and downstream with the SGW 140 using GTP S1 bearer 112. The SGW 140 acts as a router, and forwards data between a base station (e.g., source BS 110 and target BS 120) and the PGW 150. The PGW 150 provides connectivity from the UE 100 to external packet data networks 160 by being the point of exit and entry of traffic for the UE 100. The connection between the SGW 140 and the PGW 150 may be one-to-one, N-to-one, or N-to-N, wherein N is an integer greater than one.

Figure 1B:
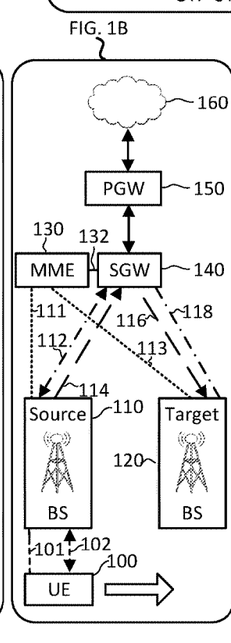

FIG. 1B illustrates an indirect tunnel setup being created between the source BS 110 and the target BS 120 through the SGW 140 in response to the source BS 110 making a handover decision to the target BS 120. As shown in FIG. 1B, the MME 130 may communicate with the SGW 140 vi an S11 signaling 132. The MME 130 may also communicate with the source BS 110 and the target BS 120 respectively through an S1 signaling interface 111 and an S1 signaling interface 113. The MME 130 manages authentication and authorization for the UE 100. The MME 130 may also retain location information at the tracking area level for the UE 100. For example, the MME 130 may allocate and reallocate a tracking area identity list to the UE 100.

As illustrated in FIG. 1B, the UE 100 and the source BS 110 exchange measurement control via radio signaling 101. Based on the measurement control, the source BS 110 may communicate an S1 handover request to the MME 130 via the S1 signaling interface 111. In turn, the MME 130 transmits the S1 handover request to the target BS 120 via the S1 signaling interface 113. A GTP S1 bearer 118 is established between the target BS 120 and the SGW 140. Additionally, a GTP S1 bearer 114 is established between the source BS 110 and the SGW 140, and a GTP S1 bearer 116 is established between the target BS 120 and the SGW 140 to form the indirect tunnel between the source BS 110 and the target BS 120.

Figure 1C:
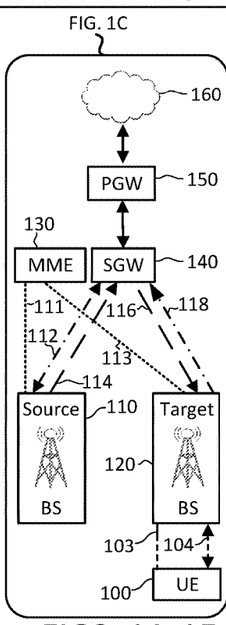

FIG. 1C illustrates the UE 100 detached from the source BS 110. Radio bearer 104 is established between the UE 100 and the target BS 120. However, the source BS 110 will continue to receive, from the SGW 140, downlink packets intended for the UE 100 until the handover of the UE 100 to the target BS 120 is complete. Because the UE 100 is detached from the source BS 110, the source BS 110 buffers the downlink packets.

The UE 100 issues the handover command to the target BS 120 via radio signaling 103. The target BS 120 notifies the MME 130 of the handover via the S1 signaling interface 113. The uplink dataflow for the UE 100 is established with the target BS 120 to the SGW 140 via the GTP S1 bearer 118. Indirect packet forwarding from the source BS 110 to the target BS 120 then occurs for downlink packets buffered on the source BS 110 via the GTP S1 bearer 114 and the GTP S1 bearer 116.

Figure 1D:
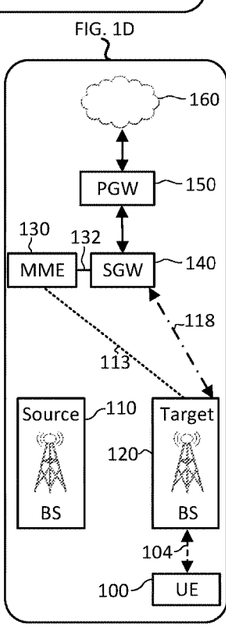

In FIG. 1D, the SGW 140 sends an End Marker (EM) packet after changing the data path. All the packets before the EM packet is forwarded along the indirect route while new packets will be buffered on the target BS 120. Both uplink and downlink communication is established via the GTP S1 bearer 118 between target BS 120 and SGW 140 for the normal flow of packets.

Figure 1E:
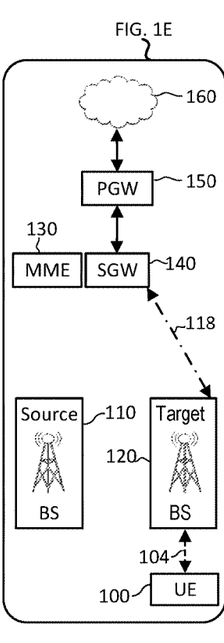

In FIG. 1E, once the source BS 110 and the MME 130 confirm that all the packets before the EM packet is forwarded along the indirect route, the handover process is complete. The UE 100 communicates with the target BS 120 via radio bearer 104 after the handover. The target BS 120 communicates both upstream and downstream with the SGW 140 using the GTP S1 bearer 118.

Figure 2A:
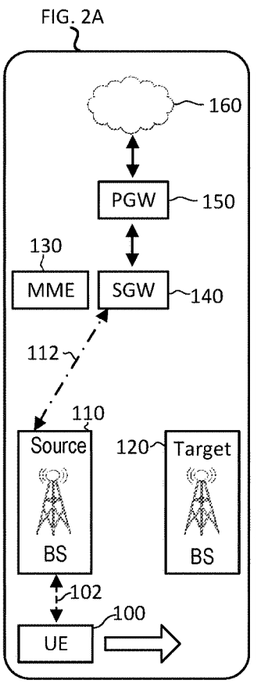
FIGS. 2A-2E are schematic diagrams illustrating triangular routing that occurs during a typical X2 handover procedure in an LTE network.
Figure 2B:
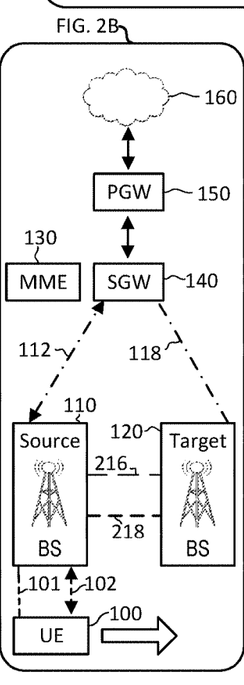

FIGS. 2A-2E are schematic diagrams illustrating triangular routing that occurs during a typical X2 handover procedure in an LTE network. The description of FIG. 2A is the same as FIG. 1A. The differences between the S1 handover procedure as illustrated in FIGS. 1A-1E and the X2 handover procedure illustrated in FIGS. 2A-2E begin in FIG. 2B, where in response to the measurement control receive from the UE 100, the source BS 110 transmits a resource status request to the target BS 120 via an X2 signaling interface 218. In response to the resource status request, the target BS 120 will indicate to the source BS 110 whether the target BS 120 has the resources available for handover of the UE 100. If resources are available for the handover of UE 100 to the target BS 120, the source BS 110 also sends an X2 handover request to the target BS 120 via the X2 signaling 218. The target BS 120 establishes a GTP S1 bearer 118 between the target BS 120 and the SGW 140. The source BS 110 then initiates buffering of the downlink packets intended for the UE 100 until the handover of the UE 100 to the target BS 120 is complete. A GTP X2 Transport bearer direct forwarding tunnel 216 is established between the source BS 110 and the target BS 120.

Figure 2C:
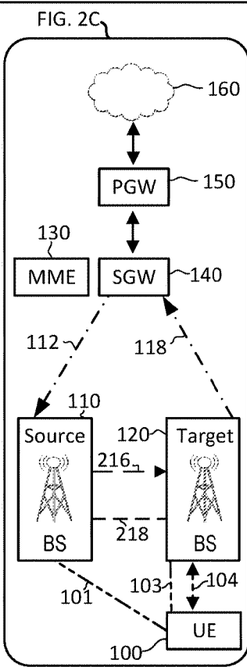

In FIG. 2C, radio bearer 104 is established between the UE 100 and the target BS 120. The UE 100 issues the handover command to the target BS 120 via radio signaling 103. The uplink dataflow for the UE 100 is established with the target BS 120 to the SGW 140 via the GTP S1 bearer 118. The source BS 110 forwards the downlink packets buffered on the source BS 110 to the target BS 120 via the GTP X2 Transport bearer direct forwarding tunnel 216.

Figure 2D:
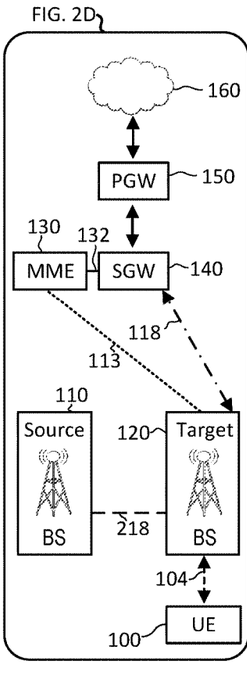

In FIG. 2D, the SGW 140 changes the data path and sends the EM packet. All the packets before the EM packet are forwarded along the GTP X2 Transport bearer direct forwarding tunnel 216 while new packets will be buffered on the target BS 120. Both uplink and downlink communication is established via the GTP S1 bearer 118 between target BS 120 and SGW 140 for the normal flow of packets.

Figure 2E:
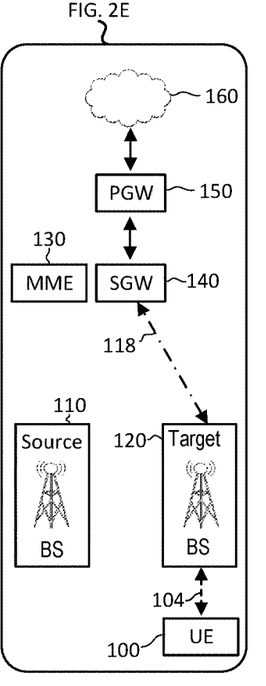

In FIG. 2E, once all the packets before the EM packet are forwarded along the GTP X2 Transport bearer direct forwarding tunnel 216, the handover process is complete. The UE 100 communicates with the target BS 120 via radio bearer 104 after the handover. The target BS 120 communicates both upstream and downstream with the SGW 140 using the GTP S1 bearer 118.

As is readily discernible, forwarding of the buffered data for the inter-base station exchange using X2 handover as illustrated in FIGS. 2A-2E is more localized and efficient than the S1 handover procedure illustrated in FIGS. 1A-1E. Even still, both the S1 and X2 handover procedures introduce latency and delay during the handover process. They both have triangular routing, buffering and re-forwarding of packets.

Accordingly, disclosed herein are various embodiments designed to implement a handover operation of a UE from a source base station to a target base station that reduces or eliminates latency and delay during the handover process. In one embodiment, the UE notifies the source base station when preparing for a handover to a target base station. The UE is aware of potential target base stations. In one embodiment, the UE uses a predictive routing feature in LISP to send duplicate packets to the predicted target base station. The source base station notifies the SGW of the target base station, and in turn the SGW replicates packets for transmitting to both the source and target base stations. The target base station buffers the replicated packets until the UE completes the handover operation, and then provides the buffered packets to the UE. The disclosed embodiments eliminates both the need for the source base station to buffer packets during the handover process and the process of forwarding the buffered packets from the source base station to the target base station. Instead, the packets will already be present at the target base station before the handover occurs, thereby reducing packet latency.

FIGS. 3A-3D are schematic diagrams illustrating an S1 handover procedure in an LTE network in accordance with a disclosed embodiment. For simplicity purposes only, FIGS. 3A-3D, and similarly FIG. 5A-5D, depict only a single target BS 320. However, the same process described herein is applicable to any number of potential target base stations 320. Similarly, although a single MME 330 and a single SGW 340 are depicted for both the source BS 310 and the target BS 320, the disclosed embodiments may be applicable networks having more than one MME 330 and/or SGW 340 (e.g., a source MME and a target MME, and/or a source SGW and a target SGW).

Figure 3A:
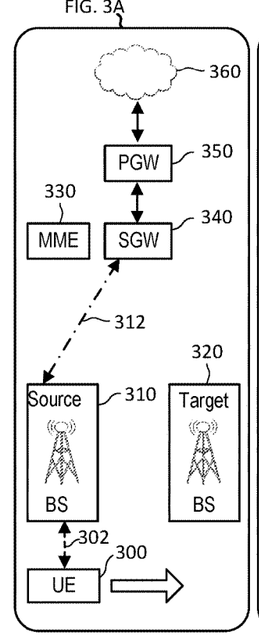
FIGS. 3A-3D are schematic diagrams illustrating an S1 handover procedure in an LTE network in accordance with a disclosed embodiment.

Beginning with FIG. 3A, the UE 300 is in communication with the source BS 310 via radio the bearer 302. The source BS 310 communicates both upstream and downstream with the SGW 340 using GTP S1 bearer 312. The SGW 340 routes data between the source BS 310 and the PGW 350, which connects the UE 300 to the external packet data networks 360.

In one embodiment, the SGW 340 is an xTR in accordance with LISP. An xTR is a LISP edge device that performs the functions of both an Ingress Tunnel Router (ITR) and an Egress Tunnel Router (ETR). An ITR is a LISP site edge device that is responsible for mapping the destination ID, or endpoint identifier (EID), to the destination location, or routing locator (RLOC). The ITR encapsulates the packets and forwards them to the other LISP sites, or they may be forwarded without any changes if the destination is a traditional IP. An ETR is a LISP edge device that receives the packets from a core network and decapsulates the packets and forwards it to the local destination EID.

Figure 3B:
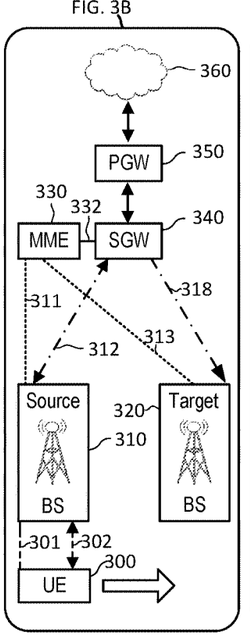

In FIG. 3B, the UE 300 and the source BS 310 exchange measurement control via radio signaling 301. In accordance with an embodiment, based on the measurement control, the source BS 310 may communicate an S1 handover request that includes one or more Routing Locators (RLOCs) or other identifiers of potential target base stations 320 to the MME 330 via the S1 signaling interface 311. In turn, the MME 330 transmits the S1 handover request to the one or more potential target base stations 320 via the S1 signaling interface 313. In response to the S1 handover request, the GTP S1 bearer 318 is established between each of the one or more potential target base stations 320 and the SGW 340.

Once the GTP S1 bearer 318 is established between each of the one or more potential target base stations 320 and the SGW 340, the SGW 340 starts replicating packets for the UE 300 to each of the potential target base stations 320 along with normal packet transmission to the source BS 310. In one embodiment, each of the potential target base stations 320 buffers in memory the received replicated packets for the UE 300. Thus, packets for the UE 300 will already be waiting at a target BS 320 without the need for the source BS 310 to buffer packets and redirect the buffered packets to the target BS 320. In one embodiment, the source BS 310 may continue to buffer the packets in case of a handover failure, thus allowing the source BS 310 to redirect the buffered packets if needed.

In accordance with one embodiment, the SGW 340 initiates the replicating and sending of the packets in response to receiving the one or more RLOCs or other identifiers of potential target base stations 320 from the source BS 310. Alternatively, in another embodiment, the SGW 340 initiates the replicating and sending of the packets in response to receiving the one or more RLOCs or other identifiers of potential target base stations 320 from the MME 330 via S11 signaling 332. Still, in another embodiment, the SGW 340 may be configured to automatically initiate the replicating and sending of the packets when the SGW 340 determines that the GTP S1 bearer 318 is established between a potential target BS 320 and the SGW 340.

Figure 3C:
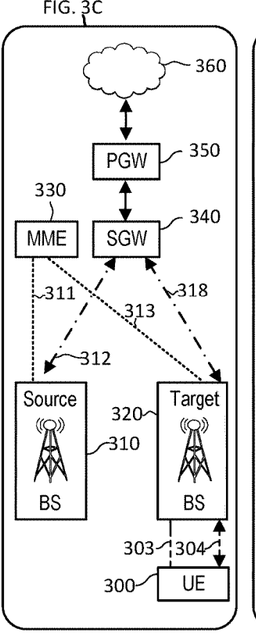

In FIG. 3C, the MME 330 sends an S1 handover command with the identifier of the target BS 320 to the source BS 310. The determination of which target BS 320 to ultimately hand over the UE 300 is made based on the actual movement/location of the UE 300 when the handover command is issued in accordance with the LTE standard/protocol or other communication standards/protocols (e.g., 3GPP). The source BS 310 sends the identifier of the target BS 320 to the UE 300. The UE 300 detaches from the source BS 310 and issues the handover command to the target BS 320 via radio signaling 303. The target BS 320 notifies the MME 330 of the handover via the S1 signaling interface 313. The uplink dataflow for the UE 300 is established with the target BS 320 to the SGW 340 via the GTP S1 bearer 318.

In one embodiment, the SGW 340 stops replicating packets to the source BS 310 and any other potential target base stations 320. Additionally, in some embodiments, the SGW 340 may signal to the other potential target base stations 320 to discard the replicated packets in their buffers for the UE 300. Alternatively, in some embodiments, the other potential target base stations 320 may be configured to automatically discard the replicated packets in their buffers for the UE 300 after a predetermined time or after additional space is needed in the buffer of a potential target BS 320.

Figure 3D:
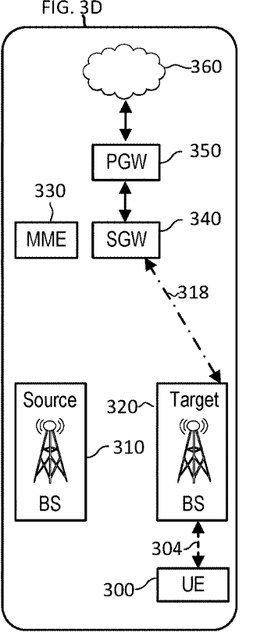

In FIG. 3D, the handover is complete. Communication between the SGW 340 and the source BS 310 is terminated after the handover. The UE 300 communicates with the target BS 320 via radio bearer 304. As stated above, since replicate packets are transmitted to the target BS 320 prior to the UE 300 detaching from the source BS 310, there is no need to buffer and redirect packets from source BS 310 to target BS 320 as described in FIGS. 1A-1E. Thus, no triangular routing of GTP tunnels occurs.

Figure 4:
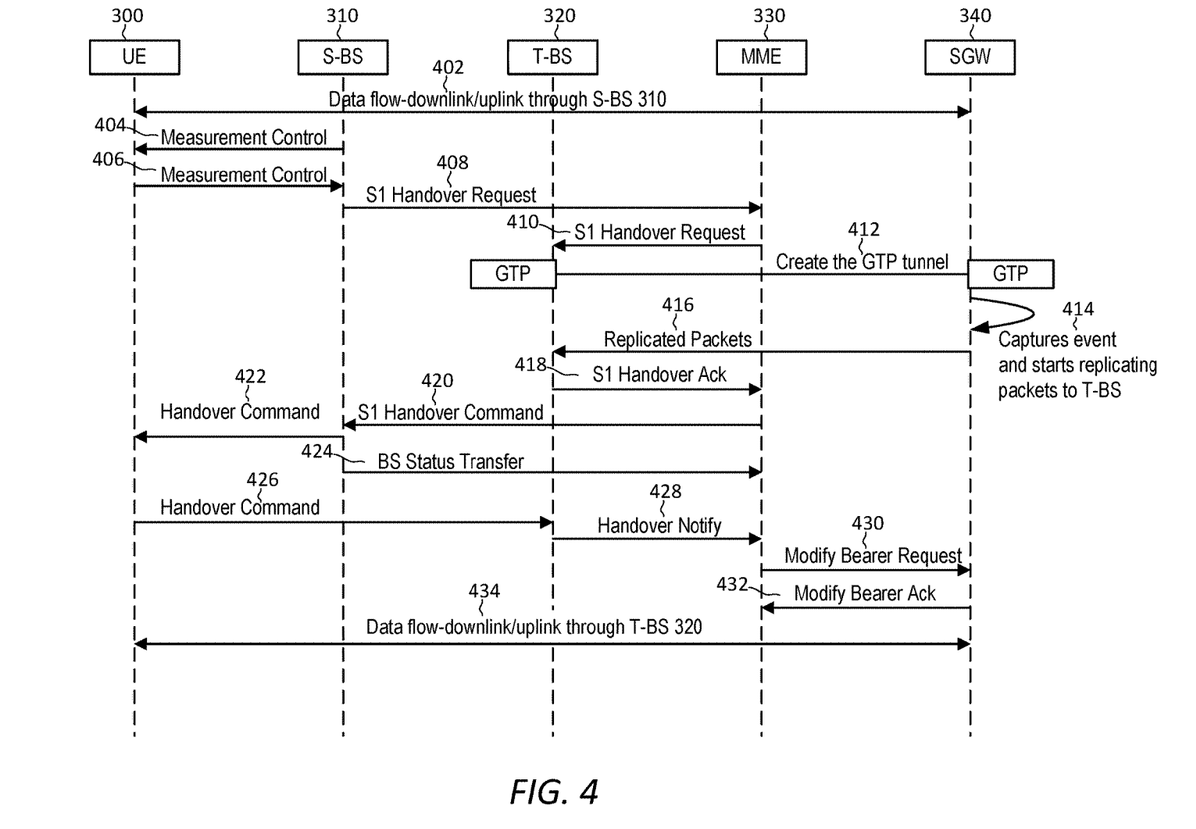
FIG. 4 is a sequence diagram illustrating an S1 handover procedure in an LTE network in accordance with a disclosed embodiment.

FIG. 4 is a sequence diagram illustrating an S1 handover procedure in an LTE network in accordance with a disclosed embodiment. In the depicted embodiment, the S1 handover procedure begins at step 402 with downlink data flowing from the SGW 340 to the UE 300 via the source BS 310, and uplink data flowing from the UE 300 to the SGW 340 via the source BS 310. At step 404, the source BS 310 sets and sends the measurement control thresholds for sending measurement reports to the UE 300. The UE 300 transmits the management control reports to the source BS 310 at step 406.

At step 408, the source BS 310 initiates an S1-based handover to a target BS 320 by sending an S1 handover request to the MME 330. As described above, in one embodiment, the S1 handover request to the MME 330 may include identifiers for one or more target base stations 320 as described in further detailed below. Additionally, because the disclosed embodiments do not require data forwarding, the source BS 310 does not need to indicate to the MME 330 which bearers are subject to data forwarding (i.e., no data forwarding tunnel via the SGW 340 as described in FIGS. 1A-1E).

At step 410, the MME 330 sends an S1 handover request message to the target BS 320. The S1 handover request message creates the UE 300 context in the target BS 320, including information about the bearers, and the security context. At step 412, the target BS 320 creates a GTP S1 bearer tunnel to the SGW 340. At step 414, the SGW 340 captures the event (or receives other notifications of the event as described in the above embodiments) and starts replicating packets to the target BS 320 at step 416.

At step 418, the target BS 320 responds back to the MME 330 with a handover request acknowledge message. In one embodiment, this message includes a list of addresses and tunnel endpoint IDs (TEIDs) allocated at the target BS 320. At this point, the typical S1 handover procedure as described in FIGS. 1A-1E would require the indirect data forwarding GTP tunnel be created between the source BS 310 and the SGW 340, and the SGW 340 and the target BS 320. However, because the disclosed embodiments replicate packets to the target BS 320 immediately after creating the GTP S1 bearer tunnel between the target BS 320 and the SGW 340, the disclosed embodiments do not require data forwarding, and thus do not require the creation of the indirect data forwarding GTP tunnel and further do not require the actual process of forwarding packets from the source BS 310 to the target BS 320.

At step 420, the MME 330 sends an S1 handover command message to the source BS 310. In one embodiment, the S1 handover command message to the source BS 310 includes a list of bearers to be released. The source BS 310 in turn sends a handover command message to the UE 300 at step 422. In one embodiment, the handover command message to the UE 300 includes a new cell radio network temporary identifier (C-RNTI) and new data radio bearer (DRB) Identifier to identify the UE and a data radio bearer within the UE 300 to the target BS 320. The UE 300 detaches from the source BS 310 but is not communicating with the target BS 320. The UE 300 is in what's known as a radio resource control (RRC)-Idle state, in which the radio of the UE 300 is inactive but an IP address is assigned and tracked by the network.

At step 424, the source BS 310 sends a status transfer message to the MME 330 to convey the status of the handover. In one embodiment, the status transfer message includes the Packet Data Convergence Protocol (PDCP) and Hyper Frame Number (HFN) status of the Evolved-Universal Mobile Telecommunications Service (UMTS) Terrestrial Radio Access Network (E-UTRAN) Radio Access Bearers (E-RABs) for which PDCP status preservation applies. In one embodiment, the MME 330 conveys the status message to the target BS 320 (not depicted).

At step 426, the UE 300 sends a handover command to the target BS 320. In one embodiment, the target BS 320 accepts the request and responds back with a timing adjustment and an uplink resource grant (not depicted). Additionally, in one embodiment, after the UE 300 has successfully synchronized to the target BS 320, it sends a handover confirm message to the target BS 320 (not depicted). The uplink data is now flowing directly from the target BS 320 to the SGW 340.

The target BS 320 sends a handover notify message to the MME 330 at step 428 to indicate that handover is successful. At step 430, the MME 330 sends a modify bearer request to the SGW 340 to modify the path for the UE 300 (i.e., switch data path for the UE 300 from the source BS 310 to the target BS 320). The SGW 340 at step 432 provides a modify bearer request acknowledgment to the MME 330 after modifying the path. At step 434, both the downlink and uplink data for the UE 300 are routed through the target BS 320, thus completing the S1 handover process according to an embodiment.

Figure 5A:
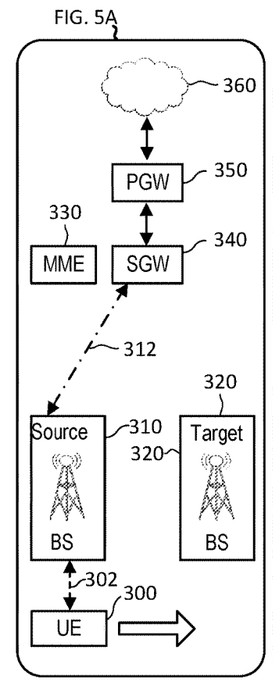
FIGS. 5A-5D are schematic diagrams illustrating an X2 handover procedure in an LTE network in accordance with a disclosed embodiment.
Figure 5B:
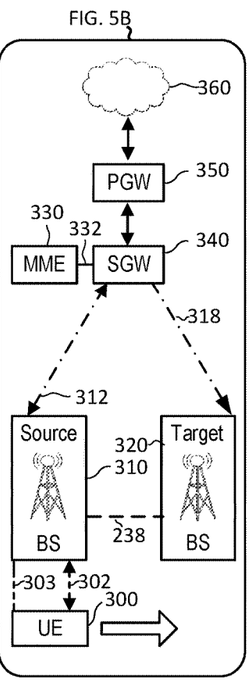

FIGS. 5A-5D are schematic diagrams illustrating an X2 handover procedure in an LTE network in accordance with a disclosed embodiment. The description of FIG. 5A is the same as FIG. 3A. In FIG. 5B, the UE 300 and the source BS 310 exchange measurement control via radio signaling 301. In accordance with an embodiment, based on the measurement control, the source BS 310 may communicate an X2 handover request to one or more potential target base stations 320 via the X2 signaling interface 218. In turn, the GTP S1 bearer 318 is established between each of the one or more potential target base stations 320 and the SGW 340. Once the GTP S1 bearer 318 is established between each of the one or more potential target base stations 320 and the SGW 340, the SGW 340 starts replicating packets for the UE 300 to each of the potential target base stations 320 along with normal packet transmission to source BS 310.

Similar to the S1 handover procedure in FIGS. 3A-3D, each of the potential target base stations 320 may buffer in memory the received replicated packets for the UE 300. Thus, packets for the UE 300 will already be waiting at a target BS 320 without the need for the source BS 310 to buffer packets and redirect the buffered packets to the target BS 320.

In one embodiment, the SGW 340 initiates the replicating and sending of the packets in response to receiving from the source BS 310 a list of one or more RLOCs or other identifiers associated with the potential target base stations 320. In another embodiment, the SGW 340 may be configured to automatically initiate the replicating and sending of the packets when the SGW 340 determines that the GTP S1 bearer 318 is established between a potential target BS 320 and the SGW 340.

Figure 5C:
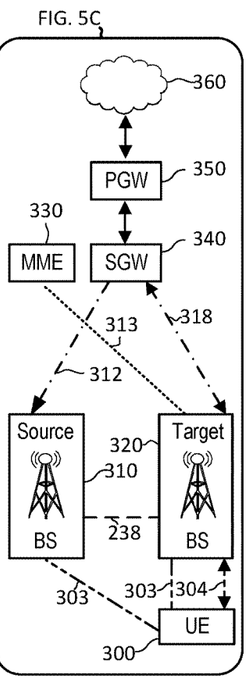

In FIG. 5C, the source BS 310 issues a handover command to the UE 300. In response, the UE 300 detaches from the source BS 310 and issues the handover command to the target BS 320 via radio signaling 303. As stated above, the determination of which target BS 320 to ultimately hand over the UE 300 is made based on the actual movement/location of the UE 300 when the handover command is issued in accordance with the LTE standard/protocol or other communication standards/protocols. The target BS 320 notifies the MME 330 of the handover via the S1 signaling interface 313. The uplink dataflow for the UE 300 is established with the target BS 320 to the SGW 340 via the GTP S1 bearer 318.

In one embodiment, the SGW 340 stops replicating packets to the source BS 310 and any other potential target base stations 320. Additionally, in some embodiments, the SGW 340 may signal to the other potential target base stations 320 to discard the replicated packets in their buffers for the UE 300. Alternatively, in some embodiments, the other potential target base stations 320 may be configured to automatically discard the replicated packets in their buffers for the UE 300 after a predetermined time or after additional space is needed in the buffer of a potential target BS 320.

Figure 5D:
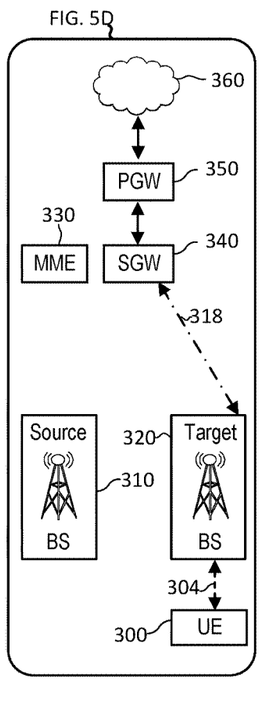

In FIG. 5D, the handover is complete. Communication between the SGW 340 and the source BS 310 is terminated after the handover. The UE 300 communicates with the target BS 320 via radio bearer 304. As stated above, since replicate packets are transmitted to the target BS 320 prior to the UE 300 detaching from the source BS 310, there is no need to buffer and redirect packets from the source BS 310 to the target BS 320 as described in FIGS. 2A-2E.

Figure 6:
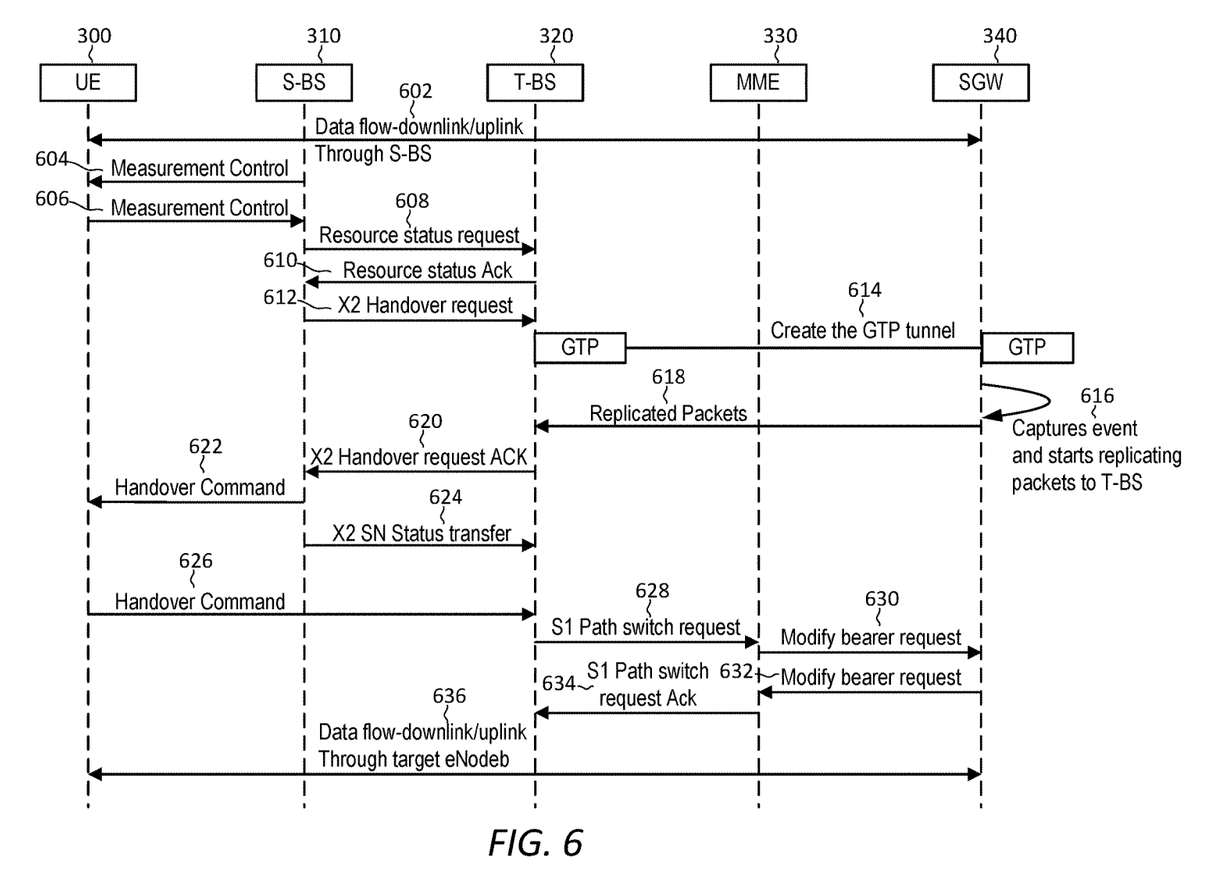
FIG. 6 is a sequence diagram illustrating an X2 handover procedure in an LTE network in accordance with a disclosed embodiment.

FIG. 6 is a sequence diagram illustrating an X2 handover procedure in an LTE network from the source BS 310 to the target BS 320 that are interconnected with an X2 interface in accordance with a disclosed embodiment. In the depicted embodiment, the X2 handover procedure begins at step 602 with downlink data flowing from the SGW 340 to the UE 300 via the source BS 310, and uplink data flowing from the UE 300 to the SGW 340 via the source BS 310. At step 604, the source BS 310 sets and sends the measurement control thresholds for sending measurement reports to the UE 300. The UE 300 transmits the management control reports to the source BS 310 at step 606.

At step 608, the source BS 310 transmits a resource status request to the target BS 320 via an X2 signaling. In response to the resource status request, the target BS 320 will indicate to the source BS 310 at step 610 whether the target BS 320 has the resources available for handover of the UE 300. If resources are available for the handover of UE 300 to the target BS 320, the source BS 310 sends an X2 handover request to the target BS 320 via the X2 signaling at step 612. The target BS 320 establishes a GTP S1 bearer tunnel between the target BS 320 and the SGW 340 at step 614.

At step 616, the SGW 340 captures the event (or receives other notifications of the event as described in the above embodiments) and starts replicating packets to the target BS 320 at step 618.

At step 620, the target BS 320 responds back to the source BS 310 with a handover request acknowledge message. In one embodiment, this message includes a list of addresses and TEIDs allocated at the target BS 320 for the UE 300. The source BS 310 sends a handover command message to the UE 310 at step 622. In one embodiment, the handover command message to the UE 300 includes a new C-RNTI and new DRB to identify the UE and a data radio bearer within the UE 300 to the target BS 320. At step 624, the source BS 310 sends a status transfer message to the target BS 320 to convey the status of the handover. Typically, at this point as described in FIGS. 2A-2E, the source BS 310 will create a GTP tunnel to the target BS 320 for the forwarding of buffered packets. However, because the disclosed embodiments replicate packets to the target BS 320 immediately after creating the GTP S1 bearer tunnel between the target BS 320 and the SGW 340, the disclosed embodiments do not require data forwarding, and thus do not require the creation of the data forwarding GTP tunnel between the source BS 310 and the target BS 320, and further do not require the actual process of forwarding packets from the source BS 310 to the target BS 320.

At step 626, the UE 300 sends a handover command to the target BS 320. In one embodiment, the target BS 320 accepts the request and responds back with a timing adjustment and an uplink resource grant (not depicted). Additionally, in one embodiment, after the UE 300 has successfully synchronized to the target BS 320, it sends a handover confirm message to the target BS 320 (not depicted). The uplink data is now flowing directly from the target BS 320 to the SGW 340.

The target BS 320 sends a handover notify or S1 switch path request message to the MME 330 at step 628 to indicate that handover is successful. At step 630, the MME 330 sends a modify bearer request to the SGW 340 to modify the path for the UE 300 (i.e., switch data path for the UE 300 from the source BS 310 to the target BS 320). The SGW 340 at step 632 provides a modify bearer request acknowledgment to the MME 330 after modifying the path. In turn, the MME 330 provides an S1 switch path request acknowledgement message to the target BS 320 at step 634. At step 636, both the downlink and uplink data for the UE 300 are routed through the target BS 320, thus completing the X2 handover process according to an embodiment.

In accordance with the disclosed embodiments, the one or more potential target base stations 320 may be selected from a list of one or more RLOCs or other identifiers associated with the potential target base stations 320. For instance, in one or more embodiments, the UE 300 may be configured to generate a list of one or more RLOCs for target base stations 320 in a predicted path of the UE 300. One example for generating a list of RLOCs for target base stations 320 in a predicted path of the UE 300 is described in U.S. Provisional Application No. 62/332,639, entitled "Predictive routing for Mobility", filed May 6, 2016, and in "LISP Predictive RLOCs", draft-farinacci-lisp-predictive-rlocs-00, dated May 6, 2016, both of which are hereby incorporated by reference in their entireties. The disclosed embodiment may further apply other restrictions to the generated list of one or more RLOCs for target base stations 320 to minimize the replication of packets to only the most probable target base stations 320. By narrowing the list of probable target base stations 320, the number of target base stations 320 that may receive replicate data packets is reduced, thus decreasing the amount of network traffic of packets that will ultimately be discarded.

Figure 7:
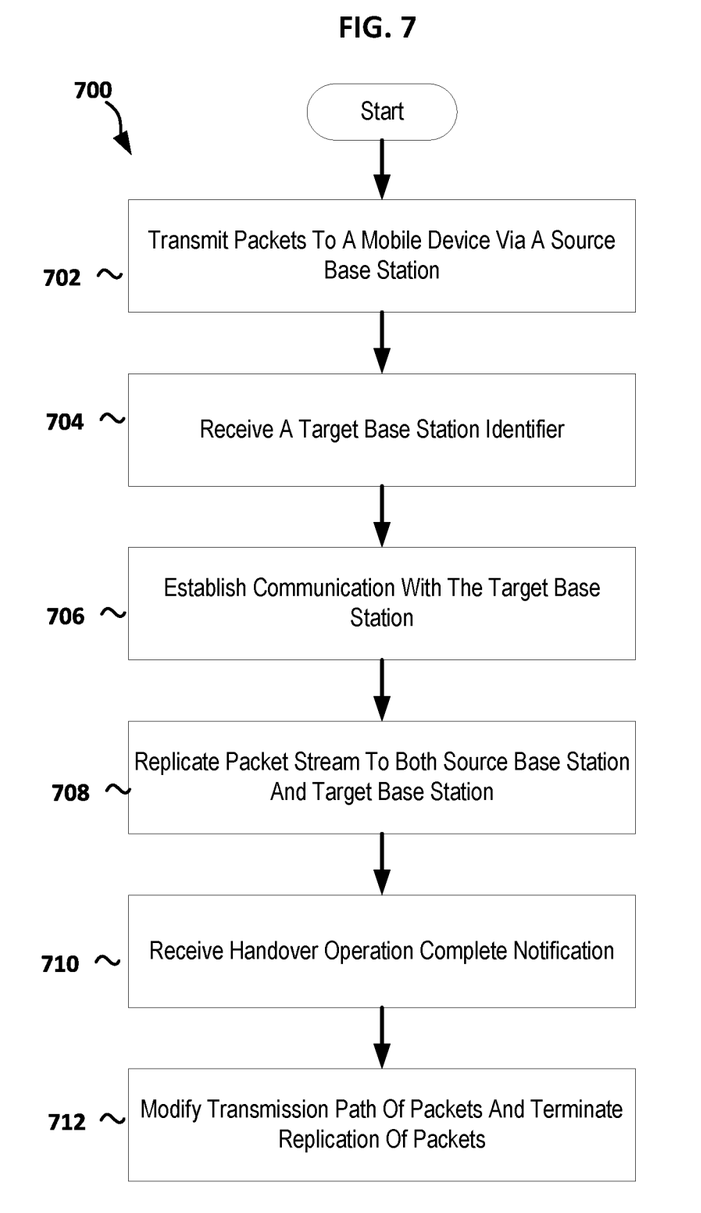
FIG. 7 is a flowchart illustrating a method for performing a handover operation in accordance with a disclosed embodiment.

FIG. 7 is a flowchart illustrating a method 700 for performing a handover operation in accordance with a disclosed embodiment. In one embodiment, the method 700 may be performed by a SGW such as SGW 340 as described above in FIGS. 3A-3D. The method begins at step 702 by transmitting packets to a mobile device such as UE 100 via a source base station currently connected to the mobile device. At step 704, the method receives a target base station identifier that identifies a target base station predicted to be a next base station to be connected to the mobile device via a handover operation. As described above, the method may receive more than one identifier that identifies more than one potential target base stations for the handover.

At step 706, the method establishes communication between the SGW and the target base station(s) in response to receiving the target base station identifier(s). At step 708, the method initiates replication of the packets that are currently being transmitted to the source base station and transmits the replicate packets to the target base station while also maintaining transmission of the packets to the source base station.

At step 710, the method receives notification from the target base station of the mobile device completing the handover operation to the target base station. At step 712, the method modifies the transmission path of the packets to the mobile device from the source base station to the target base station and terminates replication of the packets.

Figure 8:
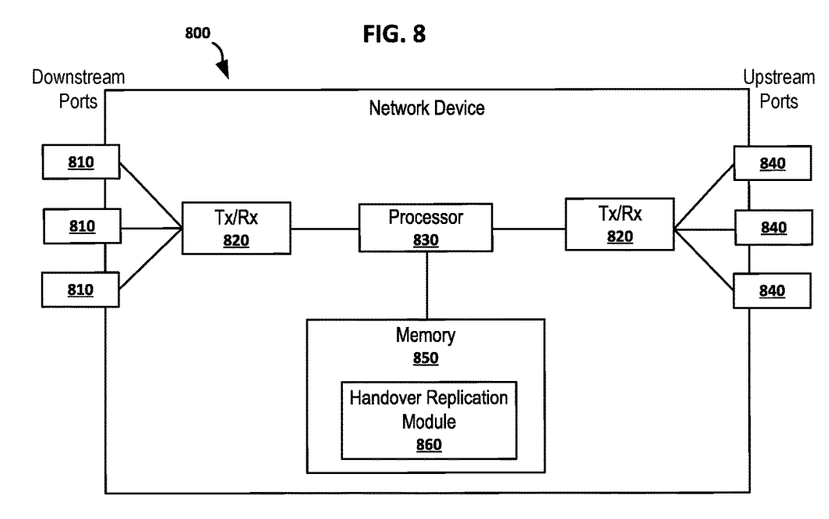
FIG. 8 is a schematic diagram illustrating a network device in accordance with a disclosed embodiment.

FIG. 8 is a schematic diagram illustrating an example of a network device 800 that may be deployed in accordance with an embodiment of the disclosure. The network device 800 may be configured as a router, gateway, server, switch, network hub or any other type of network device. The network device 800 comprises one or more downstream ports 810 coupled to a transceiver (Tx/Rx) 820, which comprise transmitters, receivers, or combinations thereof. The Tx/Rx 820 transmits and/or receives frames from other network nodes via the downstream ports 810. Similarly, the network device 800 comprises another Tx/Rx 820 coupled to a plurality of upstream ports 840, wherein the Tx/Rx 820 transmits and/or receives frames from other nodes via the upstream ports 840. The downstream ports 810 and/or the upstream ports 840 include electrical and/or optical transmitting and/or receiving components. In another embodiment, the network device 800 comprises one or more antennas coupled to the Tx/Rx 820. The Tx/Rx 820 transmits and/or receives data (e.g., packets) from other network elements via wired or wireless connections, depending on the embodiment.

A processor 830 is coupled to the Tx/Rx 820 and is configured to process the incoming data and/or determine to which nodes to send (e.g., transmit) the data. In an embodiment, the processor 830 comprises one or more multi-core processors and/or memory modules 850, which function as data stores, buffers, etc. The processor 830 is implemented as a general processor or as part of one or more application specific integrated circuits (ASICs), field-programmable gate arrays (FPGAs), and/or digital signal processors (DSPs). Although illustrated as a single processor, the processor 830 is not so limited and may comprise multiple processors. The processor 830 is configured to communicate and/or process multi-destination frames.

FIG. 8 illustrates that a memory module 850 is coupled to the processor 830 and is a non-transitory medium configured to store various types of data and/or instructions. Memory module 850 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs which are loaded into the RAM when such programs are selected for execution. The ROM is used to store instructions and perhaps data that are read during program execution. The ROM is a non-volatile memory device which typically has a small memory capacity relative to the larger memory capacity of the secondary storage. The RAM is used to store volatile data and perhaps to store instructions. Access to both the ROM and RAM is typically faster than to the secondary storage.

The memory module 850 is used to house the instructions for carrying out the various embodiments described herein. For example, in one embodiment, the memory module 850 comprises a handover replication module 860 comprising instructions and other data that when executed by the processor 830 performs the processes described herein for performing a handover operation.

It is understood that by programming and/or loading executable instructions onto the network device 800, at least one of the processors 830, the cache, and the long-term storage are changed, transforming the network device 800 in part into a particular machine or apparatus, for example, an SGW having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Although FIG. 8 depicts a particular hardware embodiment for implementing the features described herein, it should be understood that the disclosed embodiments are not limited to any particular hardware architecture and may be implemented in devices having varying hardware architecture or components.

Accordingly, the inventive concepts disclosed herein provide an efficient method for performing a handover operation of a UE from a source base station to a target base station using a predictive routing feature in LISP for packet replication to reduce latency in packet delivery to the user entity. As described above, the embodiments disclosed herein send the packets ahead of the UE in order to achieve very low latency. Essentially, the packet has already arrived before the UE itself. In one embodiment, packets are replicated over a list of nodes in a predictive path stored on the RLOC implementing the predictive routing feature in LISP. If the packet is not needed at a receiving target base station, the packet is dropped silently. The disclosed embodiments eliminate the need for the source base station to forward the packets to the target base station.

The disclosed embodiments facilitate mobile terminal handovers with zero or almost zero packet loss or ultra-low latency as it is possible to send a packet ahead of the mobile device. The disclosed embodiments ensure session continuity for a highly mobile entity with ultra-low latency. For example, the various embodiments can provide mobile communications during a handover procedure with an ultra-low latency of less than 5 milliseconds (ms). Further, the various embodiments limit the amount of packet replication occurring in the network to only the most probable target base stations. The disclosed handover procedure is more efficient than current procedure because it eliminates the need for GTP tunnels for downlink traffic re-forwarding. Additionally, the disclosed embodiments may be implemented at a relatively low cost.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. For instance, although the various embodiments are described herein using LISP, the same concept is applicable to any mobile network using an ID with a locator or any ID oriented networks.

What is claimed is:

1. A location identifier separation protocol (LISP) ingress/egress router (xTR) implemented on a Service Gateway (S-GW) comprising:
  a transceiver;
  a non-transitory memory storing executable instructions; and
  one or more processors in communication with the non-transitory memory and the transceiver, wherein the one or more processors execute the executable instructions to:
    receive packets from a remote source user using the LISP protocol intended to reach a mobile device;
    transmit the packets to the mobile device via a source base station currently in communication with the mobile device;
    receive a target base station identifier that identifies a target base station predicted to be a next base station to be in communication with the mobile device via a handover operation, the target base station identifier comprising an endpoint identifier (EID) and a routing locator (RLOC);
    establish communication between the LISP xTR and the target base station, and initiate copying of the packets currently being transmitted to the source base station to generate a source base station copy of the packets and a target base station copy of the packets in response to receiving the target base station identifier from the source base station;
    transmit the target base station copy of the packets to the target base station predicted to be the next base station to be in communication with the mobile device prior to the handover operation being initiated, while also transmitting the source base station copy of the packets to the source base station;

forward the source base station copy of the packets from the source base station to the target base station only in the event that the handover operation fails; and terminate the copying of the packets and switch transmission of the packets to the mobile device from the source base station to the target base station in response to the handover operation being completed to the target base station.

2. The LISP xTR of claim 1, wherein the target base station identifier is received from the source base station.

3. The LISP xTR of claim 1, wherein the target base station identifier is received from a mobility management entity (MME).

4. The LISP xTR of claim 1, wherein the one or more processors further execute the executable instructions to receive notification from the target base station of the mobile device completing the handover operation to the target base station.

5. The LISP xTR of claim 1, wherein the target base station buffers the target base station copy of the packets and transmits the buffered target base station copy of the packets to the mobile device following the handover operation.

6. The LISP xTR of claim 5, wherein the handover operation is an S1 handover in a Long-Term Evolution (LTE) network.

7. The LISP xTR of claim 5, wherein the handover operation is an X2 handover in a Long-Term Evolution (LTE) network.

8. The LISP xTR of claim 5, wherein the mobile device provides a second target base station identifier of a second target base station, and wherein the LISP xTR transmits the target base station copy of the packets to both the target base station and the second target base station.

9. The LISP xTR of claim 8, wherein the target base station and the second target base station both buffer the target base station copy of the packets.

10. The LISP xTR of claim 9, wherein the second target base station deletes the target base station copy of the packets if the handover operation of the mobile device is not completed to the second target base station.

11. A method of performing a handover operation, comprising:
receiving packets from a remote source user using location identifier separation protocol (LISP) intended to reach a mobile device;
transmitting the packets to the mobile device via a source base station currently in communication with the mobile device;
receiving a target base station identifier that identifies a target base station predicted to be a next base station to be in communication with the mobile device via a handover operation;
establishing communication with the target base station, and initiate copying of the packets currently being transmitted to the source base station to generate a source base station copy of the packets and a target base station copy of the packets in response to receiving the target base station identifier from the source base station;
transmitting the target base station copy of the packets to the target base station predicted to be the next base station to be in communication with the mobile device prior to the handover operation being initiated, while also transmitting the source base station copy of the packets to the source base station;
forwarding the source base station copy of the packets from the source base station to the target base station only in the event that the handover operation fails; and
terminating the copying of the packets and switching transmission of the packets to the mobile device from the source base station to the target base station in response to the handover operation being completed to the target base station.

12. The method of claim 11, wherein the target base station buffers the target base station copy of the packets and transmits the buffered target base station copy of the packets to the mobile device following the handover operation.

13. The method of claim 12, wherein the handover operation is an S1 handover in a Long-Term Evolution (LTE) network.

14. The method of claim 12, wherein the handover operation is an X2 handover in a Long-Term Evolution (LTE) network.

15. The method of claim 12, further comprising receiving a second target base station identifier that identifies a second target base station, and wherein the target base station copy of the packets are transmitted to both the target base station and the second target base station.

16. The method of claim 15, wherein the target base station and the second target base station both buffer the target base station copy of the packets.

17. The method of claim 16, wherein the second target base station deletes the target base station copy of the packets if the handover operation of the mobile device is not completed to the second target base station.

18. A computer program product embodied in a non-transitory computer readable medium having computer executable program code embodied thereon, said computer executable program code when executed by a process performs a handover operation computer program product comprising:
receiving packets from a remote source user using location identifier separation protocol (LISP) intended to reach a mobile device;
transmitting the packets to the mobile device via a source base station currently in communication with the mobile device;
receiving a target base station identifier that identifies a target base station predicted to be a next base station to be in communication with the mobile device via a handover operation;
establishing communication with the target base station in response to receiving the target base station identifier;
initiating copying of the packets currently being transmitted to the source base station to generate a source base station copy of the packets and a target base station copy of the packets;
transmitting the target base station copy of the packets to the target base station that is predicted to be the next base station to be in communication with the mobile device prior to the handover operation being initiated, while also transmitting the source base station copy of the packets to the source base station;
forwarding the source base station copy of the packets from the source base station to the target base station only in the event that the handover operation fails;
receiving notification of the mobile device completing the handover operation to the target base station; and
terminating the copying of the packets and switching transmission of the packets to the mobile device from the source base station to the target base station in response to the notification of the mobile device completing the handover operation to the target base station.

19. The computer program product of claim 18, wherein the target base station buffers the target base station copy of the packets and transmits the buffered target base station copy of the packets to the mobile device following the handover operation.

20. The computer program product of claim 19, wherein the handover operation is one of an S1 handover and an X2 handover in a Long-Term Evolution (LTE) network.

* * * * *